McCarty & Beck.
Sheep-Shearing Mach.
N°. 88,317.    Patented Mar. 30, 1869.
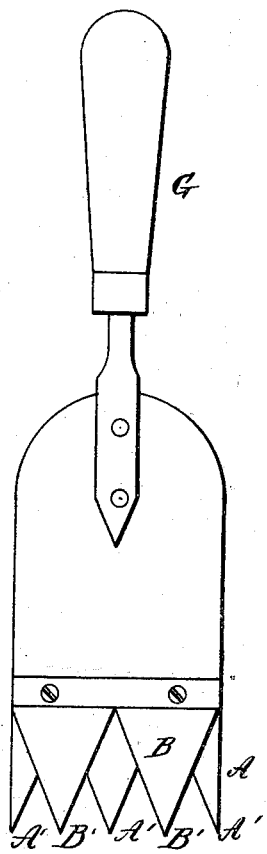
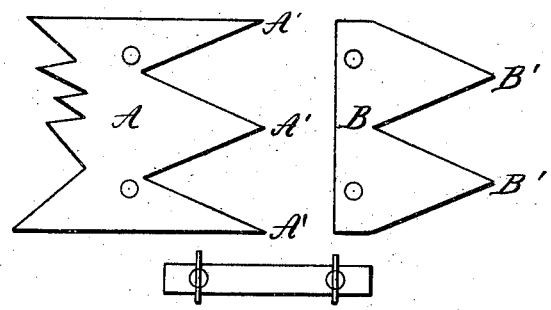
Witnesses
Fred Thomas
S. J. Noyes
Inventors,
D. McCarty & J. F. Beck by
J. W. Beadle Atty

DAVID McCARTY AND J. F. BECK, OF TIFFIN TOWNSHIP, OHIO.

Letters Patent No. 88,317, dated March 30, 1869.

IMPROVEMENT IN TOOL FOR SHEARING SHEEP.

The Schedule referred to in these Letters Patent and making part of the same.

*To all whom it may concern:*

Be it known that we, DAVID McCARTY and J. F. BECK, both of Tiffin township, in the county of Adams, and State of Ohio, have invented a new and improved Tool for Shearing Sheep; and we do hereby declare that the following is a full and exact description of the same, reference being had to the accompanying drawings, and to the letters of reference marked thereon.

This invention consists of a device, to be hereinafter fully described, by which the operation of shearing sheep may be performed more rapidly than by the old method, and at the same time without the painful and laborious process of opening and closing the hand, as in operating the shears.

In the drawing, the device is represented by two plates, A and B, which are made on the forward end of the tool, serrated in form, the teeth A' A' A' B' B' being made large, and so constructed and arranged that the points of the teeth of one plate shall be located midway between the points of the teeth of the other, to which it is fastened.

In the form shown, there are two fully-formed teeth, of the shape usual in the common crosscut-saw, or a little more elongated, on the one plate, and on the other, one of similar shape and size, and on the outside of this two half teeth, thus making, when the plates are placed properly together, a well-formed instrument, for easy handling, its sides being straight and parallel.

These plates may be fastened together in any well-known manner. They are represented in the drawing as fastened by set-screws, the heads of which are countersunk in the plate, on one side, and hold in a strip of metal placed across the plate on the other side.

These screws should be so made and arranged as to be easily removed, and the plates separated, for the purpose of sharpening.

The tool is provided with a suitable handle, G, attached to one plate, on the end opposite the cutting-edges.

The points of the teeth should be slightly rounded and smooth, in order not to catch, and cut or prick the animal in the process of shearing, the points being obviously not necessary as a cutting-surface to act on the wool.

In the operation of our device, the instrument is grasped in one hand, the other being free to open and arrange the wool, and is thrust forward, the points of the teeth entering and dividing the wool. As the tool advances, the wool is pressed along the sharp edges of the teeth, converging to the apexes, and as it is pressed, is cut on both sides.

The advantages of our improved tool over the old method are obvious. It does not require the painful and laborious process of opening and shutting the hand, does not cut the skin of the animal, and is much more rapid in its operation.

It may be made of the ordinary saw-plate metal, and constructed with very little expense, and is not liable to get out of repair.

Having thus fully described our device,

What we claim as our invention, and desire to secure by Letters Patent of the United States, is—

The device for shearing sheep, composed of the two plates A and B, having the whole and half teeth, of form shown, each plate being provided with cutting-edges, as described, the two parts being attached to each other, and provided with a handle, all being arranged substantially as and for the purpose set forth.

This specification signed and witnessed, this 8th day of June, 1868.

DAVID McCARTY.
J. F. BECK.

Witnesses:
JAS. W. CYLER,
R. L. KEPPERLING.